(12) United States Patent
Harris et al.

(10) Patent No.: US 7,768,708 B1
(45) Date of Patent: Aug. 3, 2010

(54) LIGHT SOURCE HAVING SPATIALLY INTERLEAVED LIGHT BEAMS

(75) Inventors: Geoffrey G. Harris, Midland (CA); Daniel Mitchell, Port McNicoll (CA); Bob Scott, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 350 days.

(21) Appl. No.: 11/347,331

(22) Filed: Feb. 3, 2006

(51) Int. Cl.
*G02B 27/14* (2006.01)
*G02B 27/10* (2006.01)

(52) U.S. Cl. ...................................... 359/636; 359/618

(58) Field of Classification Search ................. 359/629, 359/634, 636, 639, 640, 833, 834, 618; 385/36; 372/97, 107, 108
See application file for complete search history.

(56) References Cited

U.S. PATENT DOCUMENTS

| | | | |
|---|---|---|---|
| 4,566,761 A * | 1/1986 | Carlsen et al. ............... | 359/634 |
| 5,543,251 A * | 8/1996 | Taylor ........................... | 430/1 |
| 6,493,148 B1 * | 12/2002 | Anikitchev .................. | 359/634 |
| 6,498,680 B1 | 12/2002 | Zhou et al. | |
| 6,922,288 B2 * | 7/2005 | Yamanaka et al. .......... | 359/618 |
| 7,010,194 B2 * | 3/2006 | Anikitchev et al. ........... | 385/36 |
| 2001/0055134 A1 | 12/2001 | Zhao | |
| 2001/0055154 A1 | 12/2001 | Zhao | |
| 2002/0027711 A1 | 3/2002 | Tai et al. | |
| 2002/0085252 A1 | 7/2002 | Chen et al. | |
| 2002/0168146 A1 | 11/2002 | Watanabe | |
| 2002/0181872 A1 | 12/2002 | Dent et al. | |
| 2002/0186467 A1 | 12/2002 | Huang et al. | |
| 2003/0007157 A1 | 1/2003 | Hulse et al. | |
| 2003/0007232 A1 | 1/2003 | Zhao | |
| 2003/0007248 A1 | 1/2003 | Zhao | |
| 2003/0007249 A1 | 1/2003 | Zhao | |
| 2003/0025998 A1 | 2/2003 | Zhao | |
| 2003/0026521 A1 | 2/2003 | Amin et al. | |
| 2003/0068120 A1 | 4/2003 | Lacey et al. | |
| 2003/0086150 A1 | 5/2003 | Moon et al. | |
| 2003/0099013 A1 | 5/2003 | Su et al. | |
| 2003/0123878 A1 | 7/2003 | Li et al. | |
| 2003/0194184 A1 | 10/2003 | Carberry et al. | |
| 2004/0141181 A1 | 7/2004 | Wang et al. | |
| 2004/0223222 A1 | 11/2004 | Schott et al. | |
| 2004/0246582 A1 | 12/2004 | Du et al. | |
| 2005/0041290 A1 | 2/2005 | Du et al. | |
| 2005/0135737 A1 | 6/2005 | Amin et al. | |
| 2005/0174658 A1 * | 8/2005 | Long et al. .................. | 359/833 |

\* cited by examiner

*Primary Examiner*—Alicia M Harrington
(74) *Attorney, Agent, or Firm*—H. St. Julian, Esq.

(57) ABSTRACT

A light source includes a first set of first beam sources having parallel output beams lying in a first-beam-source plane and a second set of second beam sources having parallel output beams lying in a second-beam-source plane. The first-beam-source output beams are parallel to the second-beam-source output beams, but are spatially offset in a direction perpendicular to the first-beam-source output beams. A spatial optical interleaver disposed receives the first-beam-source output beams and the second-beam-source output beams. The first-beam-source output beams pass unimpeded through a set of first-beam openings in the spatial optical interleaver, and the second-beam-source output beams are reflected parallel to the first-beam-source output beams and in the first-beam-source plane.

28 Claims, 2 Drawing Sheets ly from the individual output beams of a number of lowerpower are combined using a spatial optical interleaver as a beam combiner. The optical interleaver is of a relatively simple design that minimizes fabrication and alignment costs, while also facilitating cooling and minimizing excessive heating of the structure that would otherwise lead to premature failure.

LIGHT SOURCE HAVING SPATIALLY INTERLEAVED LIGHT BEAMS

This invention relates to a light source in which the output beams of a number of individual beam sources of lower power are interleaved and thence combined to form a high-power light beam.

BACKGROUND OF THE INVENTION

One approach to creating a light source with a very high output power is to combine the individual output beams of a number of lower-power light sources such as lasers or light-emitting diodes. The combination of the individual output beams is accomplished spatially. That is, the individual output beams are supplied to a beam combiner, and the beam combiner directs the individual output beams in a parallel fashion through a small cross-sectional area to create the high-power beam. This approach also allows the individual lower-power light sources to be spaced apart to facilitate their cooling.

The existing beam combiners typically use spatial combiners having an optical surface whose properties are different in different areas. For example, the spatial combiners may include dielectric mirror stacks positioned on either side of a closely spaced masked region of high light transmission. One beam is reflected from the mirror stacks, while the other beam is passed through the region of high light transmission. The structure is repeated for each set of the light sources that is to be combined. This approach is operable to a degree, but has drawbacks. The structure of the spatial combiner is complicated and expensive to produce. There may be excessive heating of the beam combiners as the numerous lower-power light beams pass through them, reducing the life expectancy of the beam combiners before failure. In another approach, light beams may be combined with polarization combiners, which require polarization of the light beams and also are subject to excessive heating.

There is a need for a less-complex approach to spatially combining the output beams of a number of lower-power light sources such as laser or LED light sources. Any such approach should minimize heating of the apparatus to lengthen its expected lifetime. The present invention fulfills this need, and further provides related advantages.

SUMMARY OF THE INVENTION

The present invention provides a higher-power light source in which the output beams of a number of individual lower-power light sources are combined using a spatial optical interleaver as a beam combiner. The optical interleaver is of a relatively simple design that minimizes fabrication and alignment costs, while also facilitating cooling and minimizing excessive heating of the structure that would otherwise lead to premature failure.

In accordance with the invention, a light source comprises a first set of first beam sources, wherein each of the first beam sources has a respective first-beam-source output beam, and a second set of second beam sources, wherein each of the second beam sources has a respective second-beam-source output beam. A spatial optical interleaver is disposed to receive the first-beam-source output beams and the second-beam-source output beams. The first-beam-source output beams pass unimpeded through a set of first-beam openings in the spatial optical interleaver, and the second-beam-source output beams are reflected by the spatial optical interleaver to be interleaved with the first-beam-source output beams.

In an embodiment of interest, a light source comprises a first set of first beam sources. The first beam sources lie in a first-beam-source plane and are spaced apart by a first-source distance. Each of the first beam sources has a respective first-beam-source output beam, and all of the first-beam-source output beams are parallel. There is also a second set of second beam sources. Each of the second beam sources has a respective second-beam-source output beam, and all of the second-beam-source output beams are parallel. Preferably, each of the first and second beam sources is a laser or a light-emitting diode. The second beam sources lie in a second-beam-source plane and are spaced apart by a second-source distance (which is preferably the same as the first-source distance). Each of the second beam sources has a second-beam-source output beam, and all of the second-beam-source output beams are parallel. The first-beam-source plane and the second-beam-source plane are parallel but spaced apart. The first-beam-source output beams are parallel to the second-beam-source output beams, but are spatially offset in a direction perpendicular to the first-beam-source output beams.

A spatial optical interleaver is disposed to receive the first-beam-source output beams and the second-beam-source output beams. The first-beam-source output beams pass unimpeded through a set of first-beam openings in the spatial optical interleaver. The second-beam-source output beams are reflected parallel to the first-beam-source output beams and in the first-beam-source plane.

Preferably in any of the embodiments, the spatial optical interleaver comprises a plurality of prism elements equal in number to a number of the second beam sources and positioned to receive the second-beam-source output beams. Each prism element comprises a first total internal reflection surface that reflects each respective second-beam-source output beam out of the second-beam-source plane, and a second total internal reflection surface that thereafter reflects each respective second-beam-source output beam into the first-beam-source plane. There may be a spacer that spaces each pair of the prism elements apart by the second-source distance. The spacers and prism elements may be fabricated separately and then stacked, or stacked and joined together. The spacers and the prism elements may be integral and comprise a single piece of material.

The present approach interleaves the multiple lower-power source output beams to produce a combined higher-power beam. "Higher" and "lower" are used herein relative to each other—they do not suggest any particular values of power except that one is of higher power than the other. "Combined" means that the individual parallel lower-power source output beams are interleaved and brought closer together to produce separate spatial portions of the higher-power beam, but are not superimposed. The result is that the higher-power beam power has a power that is the sum of the powers of the individual lower-power beams, and has a power density approaching that of the individual lower-power beams and is ideally the same as that of the individual lower-power beams within +/−25 percent, more preferably within +/−10 percent. The present approach achieves the interleaving without the use of expensive multilayer deposited mirror structures. Additionally, heating of the optical interleaver structure is minimized by passing half of the output beams through holes in the structure of the optical interleaver, so that there is no heating of the optical interleaver structure at all from this source. Heating of the optical interleaver structure is otherwise potentially a major cause of premature failure. The optical interleaver structure also may be artificially cooled. The optical interleaver is readily manufactured, assembled, and aligned with the beam sources, and the alignment is maintained during service.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
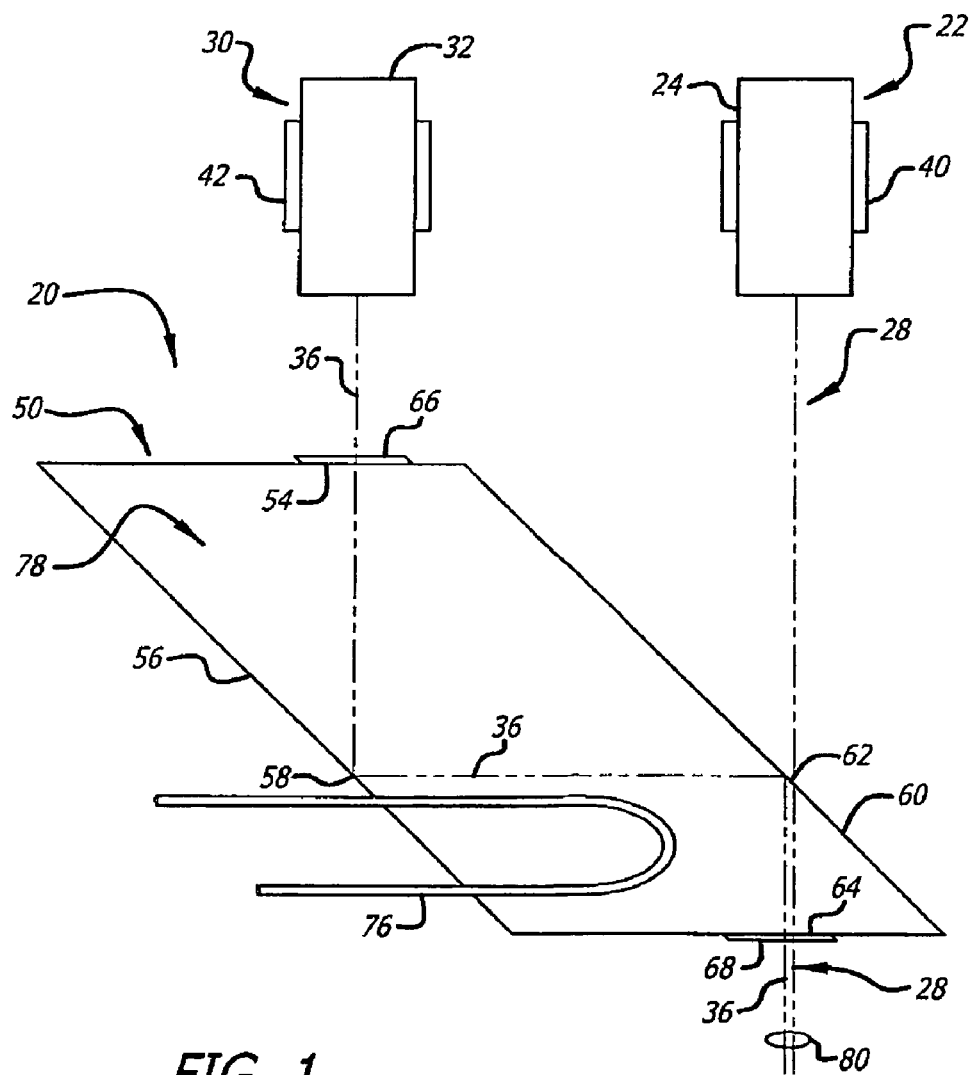
FIG. 1 is a schematic plan view of a light source using a first embodiment of a spatial optical interleaver.
Figure 2:
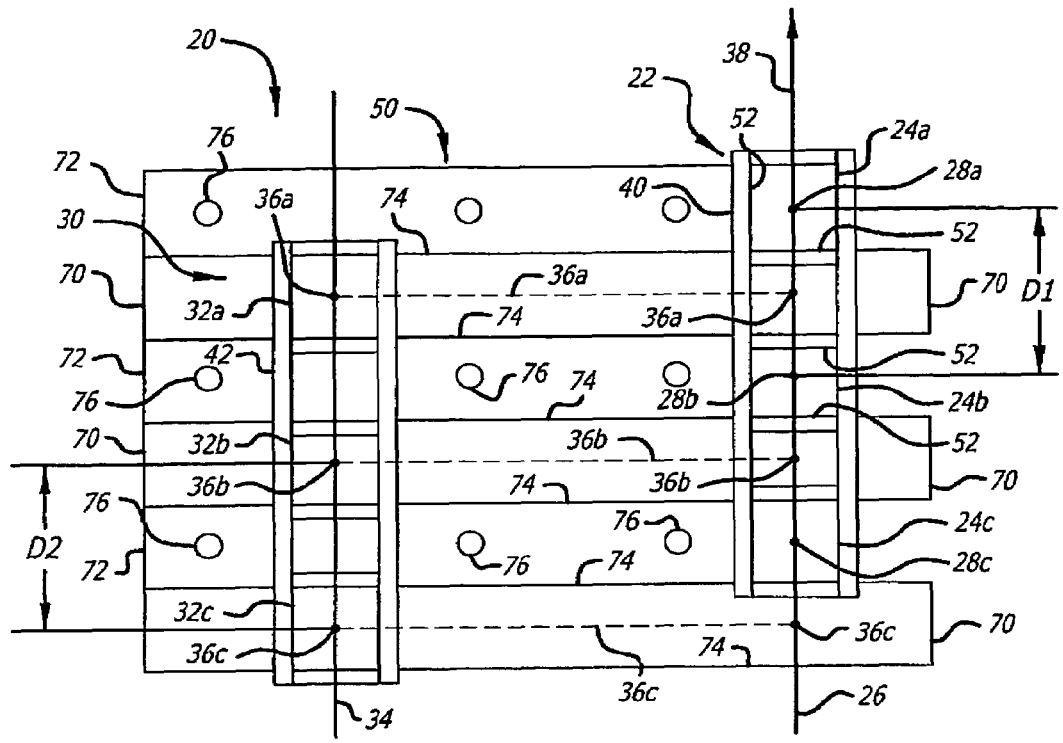
FIG. 2 is a schematic front elevational view of the light source of FIG. 1.

FIGS. 1-2 schematically depict a first embodiment of a light source 20 according to the present approach, illustrating its structure and principles of operation. FIG. 1 is a plan view, and FIG. 2 is the corresponding front elevational view. Not all of the elements are visible in FIG. 1, because some elements lie directly below the illustrated elements.

The light source 20 comprises a first set 22 of first beam sources 24. In this case, the first set 22 of first beam sources 24 includes three first beam sources 24a, 24b, and 24c. The first beam sources 24 lie in a stacked arrangement in a first-beam-source plane 26 and are spaced apart by a first-source distance D1 (which may be the same for each pair of the first beam sources 24 or may be different for different pairs of the first beam sources 24). Each of the first beam sources 24 has a first-beam-source output beam 28, specifically the respective first-beam-source output beams 28a, 28b, and 28c (represented by dots in FIG. 2). In this embodiment, all of the first-beam-source output beams 28 are parallel to each other, but in other embodiments the first-beam-source output beams are not necessarily parallel to each other.

A second set 30 of second beam sources 32 here includes three second beam sources 32a, 32b, and 32c. (It is preferred but not necessary that the number of second beam sources 32 is equal to the number of first beam sources 24. There should, however, be at least two of each type of beam source 24 and 32.) The second beam sources 32 preferably lie in a stacked arrangement in a second-beam-source plane 34 and are spaced apart by a second-source distance D2. The second-source distances D2 are preferably, but not necessarily, the same for each pair of the second-beam sources 32, and are preferably, but not necessarily, equal to the first source distances D1, which are also preferably the same for each pair of first beam sources 24. Each of the second beam sources 32 has a second-beam-source output beam 36, in this case three second-beam-source output beams 36a, 36b, and 36c. The first-beam-source plane 26 and the second-beam-source plane 34 are preferably but not necessarily parallel but spaced apart. In this embodiment, the first-beam-source output beams 28 are parallel to each other and to the second-beam-source output beams 36, but are spatially offset in a direction 38 that is perpendicular to the first-beam-source output beams 28 and lies in the first beam source plane 26. The spatial offset is preferably D1/2=D2/2.

The first beam sources 24 and the second beam sources 32 may be any type of light source that produces a suitable output beam. It is preferred that the first beam sources 24 and the second beam sources 32 are lasers or light-emitting diodes.

The first beam sources 24 may optionally be held together as a unit by a first beam source support structure 40. The second beam sources 32 may optionally be held together as a unit by a second beam source support structure 42.

A spatial optical interleaver 50 is disposed to receive the first-beam-source output beams 28 and the second-beam-source output beams 36. The spatial optical interleaver 50 interleaves at least some of the first-beam-source output beams 28 and the second-beam-source output beams 36. As used herein, "interleave" means that one or more of the second-beam-source output beams 36 lies between two of the first-beam-source output beams 28, or one or more of the first-beam-source output beams 28 lies between two of the second-beam-source output beams 36, when the output beams 28 and 36 are within the spatial optical interleaver 50 or after the output beams 28 and 36 exit the spatial optical interleaver 50.

The spatial optical interleaver 50 is a structure made at least in part of a material that is transparent to the second-beam-source output beams 36, preferably with a very low attenuation of the second-beam-source output beams 36 to minimize loss of beam energy and heating of the spatial optical interleaver 50. The first-beam-source output beams 28 pass unimpeded through a set of first-beam openings 52 in the spatial optical interleaver 50. That is, the first-beam-source output beams 28 do not contact the spatial optical interleaver 50. There is consequently no energy loss in the spatial optical interleaver 50 from any interaction with the first-beam-source output beams 28, and the spatial optical interleaver 50 is not heated at all by the first-beam-source output beams 28.

The second-beam-source output beams 36 are preferably, but not necessarily, reflected parallel to the first-beam-source output beams 28 and preferably, but not necessarily, in the first-beam-source plane 26 by the spatial optical interleaver 50. The beam path followed by the second-beam-source output beams 36 for the preferred embodiment is most clearly seen in FIG. 1. The second-beam-source output beams 36 leave their respective second beam sources 32 and enter the spatial optical interleaver 50 through an entry surface 54, preferably at an angle of incidence that is perpendicular or nearly perpendicular to the entry surface 54. The second-beam-source output beams 36 reflect from a first reflection surface 56 at a first reflection point 58 lying in the second-beam-source plane 34. The angle of incidence of the second-beam-source output beams 36 on the first reflection surface 56 is such that the first reflection surface 56 is a total internal reflection surface for the second-beam-source output beams 36.

The second-beam-source output beams 36 thereafter reflect from a second reflection surface 60 that preferably intersects the first beam source plane 26 at a second reflection point 62. (The second reflection point 62 need not lie perfectly in the first beam source plane 26, but is closer to the first beam source plane 26 than is the first reflection point 58.) The angle of incidence of the second-beam-source output beams 36 on the second reflection surface 60 is such that the second reflection surface 60 is a total internal reflection surface for the second-beam-source output beams 36. The second-beam-source output beams 36 reflect from the second reflection surface 60 to be parallel to the first-beam-source output beams 28, but are spatially interleaved with the first-beam-source output beams 28 as depicted in FIG. 2. After reflection from the second reflection surface 60, the second-beam-source output beams 36 pass through an exit surface 64 and out of the spatial optical interleaver 50. The second-beamsource output beams 36 are preferably perpendicular or nearly perpendicular to the exit surface 64. The entry surface 54 and the exit surface 64 may optionally be covered with respective anti-reflective coatings 66 and 68 at the respective points where the second-beam-source output beams 36 enter and exit the spatial optical interleaver 50. Such anti-reflective coatings 66 and 68 are known in the art for other applications, and are typically made of multilayer thin-film stacks.

Figure 3:
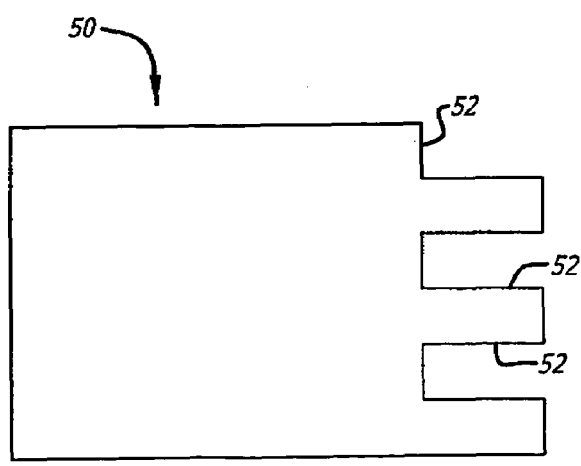
FIG. 3 is a schematic front elevational view of a second embodiment of the spatial optical interleaver.

FIGS. 2 and 3 depict two preferred embodiments for the construction of the spatial optical interleaver 50, which each operate by the principles just described. In the embodiment of FIG. 2, the spatial optical interleaver 50 is built from alternating layers of material. There are beam-passage layers 70 through which the second-beam-source output beams 36 pass, and spacers 72 (in the form of spacer layers) that position the beam-passage layers 70 at the proper spacings (usually the second-source distance D2) to receiver the second-beam-source output beams 36. The beam-passage layers 70 and the spacers 72 are stacked together. The beam-passage layers 70 must be made of the material that is transparent to the second-beam-source output beams 36, while the spacers 72 need not be made of such a transparent material. The spacers 72 are, however, preferably made of the same material as the beam-passage layers 70 to avoid thermal stresses when the beam-passage layers 70 are heated by energy loss from the second-beam-source output beams 36. The beam-passage layers 70 and the spacers 72 may be stacked and permanently or semi-permanently joined together, as with optical cement joining material, at their contact interfaces 74, or they may be stacked and mechanically clamped together, or they may be stacked but unjoined and unclamped. The second-beam-source output beams 36 do not pass through the contact interfaces 74, and therefore there is no insertion loss or attenuation loss to the joining material, where present.

Optionally, cooling elements 76 such as heat pipes or cooling tubes may be embedded in the spacers 72 and/or in those portions of the beam-passage layers 70 through which the second-beam-source output beams 36 do not pass. Because the second-beam-source output beams 36 are selected to have a high energy, heating of the spatial optical interleaver 50 by even a small attenuation loss is an important consideration. That the first-beam-source output beams 28 do not contact the material of the spatial optical interleaver 50 (but instead pass through the first-beam openings 52) is also an important advantage in relieving the potential heat loading of the spatial optical interleaver 50.

In the embodiment of FIG. 3, the spatial optical interleaver 50 has the same functionality and structure as the embodiment of FIG. 2, but is made from a single piece of transparent material. The single piece of transparent material may be cast or otherwise formed to the final required shape. The single piece of transparent material may instead initially be furnished without the first-beam openings 52, and then the first-beam openings 52 may be cut into the single piece of transparent material by precision sawing, precision grinding, or the like. The two embodiments of FIGS. 2 and 3 each have their own advantages, and the selection of the embodiment depends upon the application. For example, the embodiment of FIG. 2 allows the use of cooling elements 76 more readily than does the embodiment of FIG. 3, but the embodiment of FIG. 3 has a lower piece count in manufacturing and lower assembly/alignment costs.

The entry surface 54, the two reflecting surfaces 56 and 60, and the exit surface 64 together may be described as defining a prism element 78. There are a plurality of prism elements 78 equal in number to the number of the second beam sources 32. These prism elements 78 may be formed as separate layers (the FIG. 2 embodiment) or integrally (the FIG. 3 embodiment).

The present light source 20 thus achieves a combined beam output 80 that has the energy of the totality of the individual output beams 28 and 36, without the complexity of dielectric multilayer mirrors.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A light source comprising:
    a first set of first beam sources, wherein each of the first beam sources has a respective first-beam-source output beam;
    a second set of second beam sources, wherein each of the second beam sources has a respective second-beam-source output beam; and
    a spatial optical interleaver disposed to receive the first-beam-source output beams and the second-beam-source output beams, wherein said interleaver includes
        a set of first-beam openings through which the first-beam-source output beams pass unimpeded, and
        a plurality of prism elements equal in number to a number of the second beam sources and positioned to receive the second-beam-source output beams and reflect said second-beam-source output beams such that one or more of said second-beam-source beams lies between two of said first-beam-source beams and/or one or more of said first-beam-source beams lies between two of said second-beam-source beams, wherein each prism element comprises
            a first total internal reflection surface that reflects a respective one of the second-beam-source output beams, and
            a second total internal reflection surface that thereafter reflects the respective one of the second-beam-source output beams.

2. The light source of claim 1, wherein each of the beam sources is a laser.

3. The light source of claim 1, wherein each of the beam sources is a light-emitting diode.

4. The light source of claim 1, wherein
    the first beam sources lie in a first-beam-source plane, and
    the second beam sources lie in a second-beam-source plane.

5. The light source of claim 1, wherein the spatial optical interleaver reflects the second-beam-source output beams to be parallel to the first-beam-source output beams.

6. The light source of claim 1, wherein
    the first beam sources lie in a first-beam-source plane, and
    the second beam sources lie in a second-beam-source plane, and wherein the spatial optical interleaver reflects the second-beam-source output beam to lie in the first-beam-source plane.

7. The light source of claim 1, wherein the spatial optical interleaver
    also includes one or more spacers, each spacer adapted to space each pair of the prism elements apart.

8. The light source of claim 7, wherein
    the spacers and the prism elements are joined together.

9. The light source of claim 7, wherein
    the spacers and the prism elements are integral and comprise a single piece of material.

10. The invention of claim 1 wherein said spatial optical interleaver reflects said second-beam-source beams such that said first-beam-source beams and said second-beam-source beams are arranged in an alternating manner, wherein each first-beam-source beam is next to a second-beam-source beam and each second-beam-source beam is next to a first-beam-source beam.

11. A light source comprising:
- a first set of first beam sources, wherein the first beam sources lie in a first-beam-source plane and are spaced apart by a first-source distance, and wherein each of the first beam sources has a respective first-beam-source output beam and all of the first-beam-source output beams are parallel;
- a second set of second beam sources, wherein the second beam sources lie in a second-beam-source plane and are spaced apart by a second-source distance, wherein each of the second beam sources has a respective second-beam-source output beam and all of the second-beam-source output beams are parallel; wherein the first-beam-source plane and the second-beam-source plane are parallel but spaced apart, and wherein the first-beam-source output beams are parallel to the second-beam-source output beams, but are spatially offset in a direction perpendicular to the first-beam-source output beams; and
- a spatial optical interleaver disposed to receive the first-beam-source output beams and the second-beam-source output beams and spatially interleave said first-beam-source and second-beam-source output beams, wherein said interleaver includes
  - a set of first-beam openings through which the first-beam-source output beams pass unimpeded, and
  - a plurality of prism elements equal in number to a number of the second beam sources and positioned to receive the second-beam-source output beams and reflect said second-beam-source output beams such that the second-beam-source output beams are reflected parallel to the first-beam-source output beams and in the first-beam-source plane, and one or more of said second-beam-source beams lies between two of said first-beam-source beams and/or one or more of said first-beam-source beams lies between two of said second-beam-source beams, wherein each prism element comprises
    - a first total internal reflection surface that reflects a respective one of the second-beam-source output beams out of the second-beam-source plane, and
    - a second total internal reflection surface that thereafter reflects the respective one of the second-beam-source output beams into the first-beam-source plane.

12. The light source of claim 11, wherein the second beam sources are spaced apart by the first-source distance.

13. A light source comprising:
- a first set of first beam sources, wherein the first beam sources lie in a first-beam-source plane and are spaced apart by a first-source distance, and wherein each of the first beam sources has a respective first-beam-source output beam and all of the first-beam-source output beams are parallel;
- a second set of second beam sources, wherein the second beam sources lie in a second-beam-source plane and are spaced apart by a second-source distance, wherein each of the second beam sources has a respective second-beam-source output beam and all of the second-beam-source output beams are parallel; wherein the first-beam-source plane and the second-beam-source plane are parallel but spaced apart, and wherein the first-beam-source output beams are parallel to the second-beam-source output beams, but are spatially offset in a direction perpendicular to the first-beam-source output beams; and
- a spatial optical interleaver disposed to receive the first-beam-source output beams and the second-beam-source output beams and spatially interleave said first-beam-source and second-beam-source output beams such that one or more of said second-beam-source beams lies between two of said first-beam-source beams and/or one or more of said first-beam-source beams lies between two of said second-beam-source beams, wherein the spatial optical interleaver comprises
  - a set of first-beam openings in the spatial optical interleaver through which the first-beam-source output beams pass unimpeded, and
  - a plurality of prism elements equal in number to a number of the second beam sources and positioned to receive the second-beam-source output beams, wherein each prism element comprises
    - a first total internal reflection surface that reflects a respective one of the second-beam-source output beams out of the second-beam-source plane, and
    - a second total internal reflection surface that thereafter reflects the respective one of the second-beam-source output beams into the first-beam-source plane.

14. The light source of claim 13, wherein each of the beam sources is a laser.

15. The light source of claim 13, wherein each of the beam sources is a light-emitting diode.

16. The light source of claim 13, wherein the second beam sources are spaced apart by the first-source distance.

17. The light source of claim 13, wherein the spatial optical interleaver further includes
- a spacer that spaces each pair of the prism elements apart by the second-source distance.

18. The light source of claim 13, wherein the spatial optical interleaver further includes
- a spacer that spaces each pair of the prism elements apart by the second-source distance, wherein the spacers and the prism elements are joined together.

19. The light source of claim 13, wherein the spatial optical interleaver further includes
- a spacer that spaces each pair of the prism elements apart by the second-source distance, wherein the spacers and the prism elements are integral and comprise a single piece of material.

20. A spatial optical interleaver comprising:
- a set of first-beam openings adapted to receive and output a first set of first light beams, and
- a plurality of prism elements adapted to receive a second set of second light beams and reflect said second beams such that one or more of said first light beams lies between two of said second light beams and/or one or more of said second light beams lies between two of said first light beams, wherein each prism element comprises
  - a first total internal reflection surface that reflects a respective one of the second light beams, and
  - a second total internal reflection surface that thereafter reflects the respective one of the second light beams.

21. The invention of claim 20 wherein said first-beam openings are adapted to receive said first light beams wherein said first light beams lie in a first plane, and said prism elements are adapted to receive said second light beams wherein said second beams lie in a second plane separate from said first plane.

22. The invention of claim 21 wherein said second plane is parallel to but spaced apart from said first plane.

23. The invention of claim 21 wherein said prism elements are adapted to reflect said second light beams such that said reflected beams lie within said first plane when output from said interleaver.

24. The invention of claim 20 wherein said interleaver also includes one or more spacers, each spacer adapted to space each pair of prism elements apart.

25. The invention of claim 24 wherein said spacers and prism elements are joined together.

26. The invention of claim 24 wherein said spacers and prism elements are integral and comprise a single piece of material.

27. A spatial optical interleaver comprising:
a set of first-beam openings adapted to receive and output a first set of first light beams that lie in a first plane, and
a plurality of prism elements adapted to receive a second set of second light beams that lie in a second plane and reflect said second light beams such that the reflected second light beams lie in said first plane and one or more of said first light beams lies between two of second light beams and/or one or more of said second light beams lies between two of said first light beams, wherein each prism element comprises
a first total internal reflection surface that reflects a respective one of the second light beams, and
a second total internal reflection surface that thereafter reflects the respective one of the second light beams.

28. A method for providing a source of light including the steps of:
providing a first set of first light beams;
providing a second set of second light beams;
passing said first set of beams unimpeded through openings in a spatial optical interleaver; and
inputting said second set of beams into a plurality of prism elements in said interleaver such that upon exiting said interleaver one or more of said first light beams lies between two of said second light beams and/or one or more of said second light beams lies between two of said first light beams, wherein each prism element includes
a first total internal reflection surface that reflects a respective one of the second light beams, and
a second total internal reflection surface that thereafter reflects the respective one of the second light beams.

* * * * *